V. L. BOWMAN.
TIRE PROTECTOR.
APPLICATION FILED JAN. 6, 1913.
1,112,353.
Patented Sept. 29, 1914.
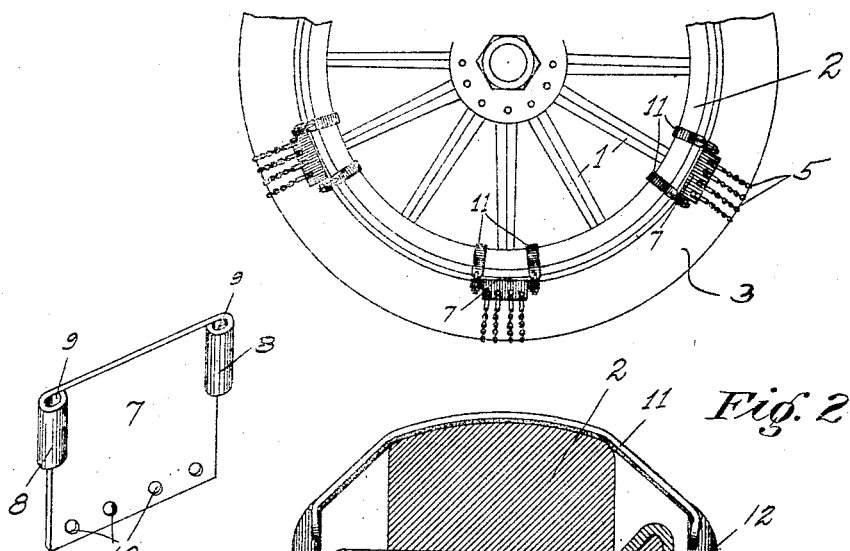
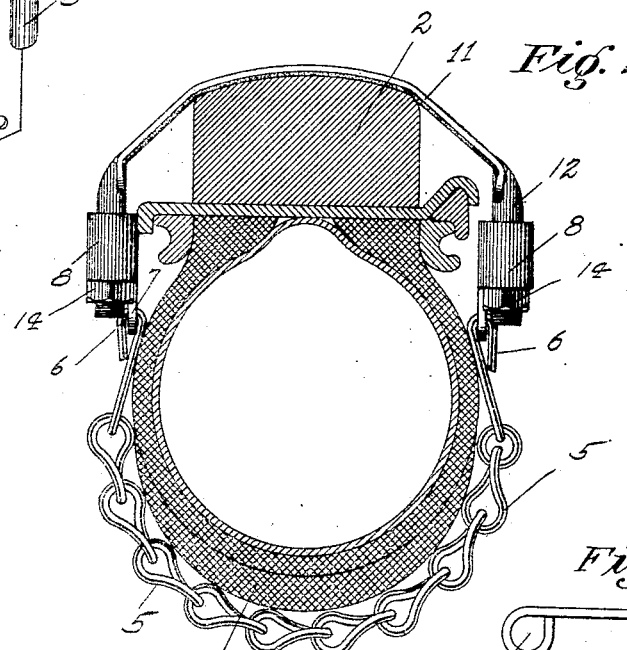
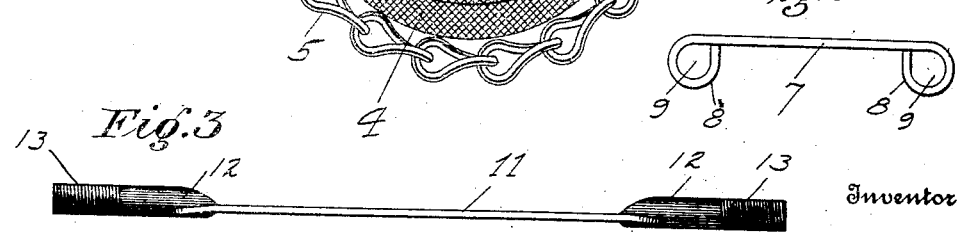
Inventor
Virgil L. Bowman
By Harry C. Schroeder
Attorney
Witnesses
Frank Harter
H. A. Stock

UNITED STATES PATENT OFFICE.

VIRGIL L. BOWMAN, OF OAKLAND, CALIFORNIA.

TIRE-PROTECTOR.

1,112,353.

Specification of Letters Patent.  Patented Sept. 29, 1914.

Application filed January 6, 1912. Serial No. 749,526.

*To all whom it may concern:*

Be it known that I, VIRGIL L. BOWMAN, a citizen of the United States, residing at Oakland, in the county of Alameda and State of California, have invented certain new and useful Improvements in Tire-Protectors, of which the following is a specification.

This invention relates to tire protectors, and has special reference to a device which is adapted to strengthen weak portions of the tire.

Another object of this invention is the production of a novel and efficient means for holding the tread chains in position upon the tire.

With these and other objects in view this invention consists of certain novel combinations, constructions, and arrangements of parts as will be hereinafter fully described and claimed.

In the accompanying drawing:—Figure 1 is a side elevation of a portion of the wheel showing several of the devices attached thereto. Fig. 2 is a central transverse section of the wheel showing one of the devices attached thereto. Fig. 3 is a side elevation of the bolt member. Fig. 4 is a perspective view of the plate used in combination with this device. Fig. 5 is a top plan view of the plate.

Referring to the accompanying drawing by numerals 1 designates the spokes which carry the rim 2 upon which the usual pneumatic tire 3 is mounted. When it is desired to strengthen a weak portion in the tire a strip 4 may be placed thereon and held in position by means of this invention which consists of the tread chains 5 which are provided with the hooked ends 6. Used in combination with this device there is a plate 7 which comprises a rectangular body portion. At the upper portions of this body and at each end thereof there is an enlarged ear 8 which is cylindrical in form and provided with the longitudinally extending aperture 9. It will be seen that these ears 8 are so formed as to extend out from the face of the plate so as to present an even surface upon the rear portion thereof, while the body of this plate extends for a considerable distance below the lower portion of these ears 8. This body is provided upon its lower portion with a plurality of apertures 10 which are adapted to receive the hooked ends 6 of the tread chain 5. In order to hold this device upon the wheel there is provided a U-shape bolt member which comprises an elongated flexible strip 11 which is integrally connected with the bolts 12 which are provided with the threaded portions 13.

When in use the chains 5 are first passed around the tire 3 and are connected to the plate 7 by means of the hooked ends 6 and the apertures 10. The strip 11 is then placed upon the rim of the wheel, and since it is flexible it will conform in contour to any shape rim at which time the bolt portions 12 are bent downwardly so as to extend through the apertures 9 formed in the ears 8 and allow the threaded portions 13 to extend therethrough at which time the nuts 14 are threaded upon the threaded portions 13, whereby the device will be held securely upon the wheel.

From the foregoing description it will be seen that a very efficient means has been produced for strengthening the weak portions of the tire by placing a strip between the weak portion and the tread chain, and at the same time there has also been produced an efficient means for preventing the wheel from skidding.

Having thus described the invention what it claimed as new, is:—

A tire protector comprising a plurality of plates, each plate formed from a blank comprising a narrow body, a narrow ear extending from each end of said body, each ear being coiled outwardly to form an aperture therein and present an even surface upon the rear portion of said body thereby preventing the plate from injuring or marring the rim of the wheel, each plate provided with a plurality of apertures formed along the edge thereof, chains secured to said plate, said chains passing through said apertures, said chains adapted to pass around a tire for constituting an anti-skidding means, offstanding bands adapted to fit over the felly of the wheel comprising thin yieldable bodies terminating in enlarged bolt portions bent at radical angles to the body and nuts threaded upon said bolt portions, and said bolt portions passing through said apertures in said ears, said nuts adapted to firmly clamp said nuts in said plates, said ears extending beyond the body portion of each plate for allowing said bolts to pass therethrough without interfering with said body.

In testimony whereof I affix my signature in presence of two witnesses.

VIRGIL L. BOWMAN.

Witnesses:
Mrs. VIRGIL L. BOWMAN,
F. P. SCHROEDER.